Feb. 3, 1931.  M. M. DEN BOER  1,791,399
DEVICE FOR SETTING UP BISCUITS, CAKES, AND THE LIKE
Filed Sept. 11, 1929
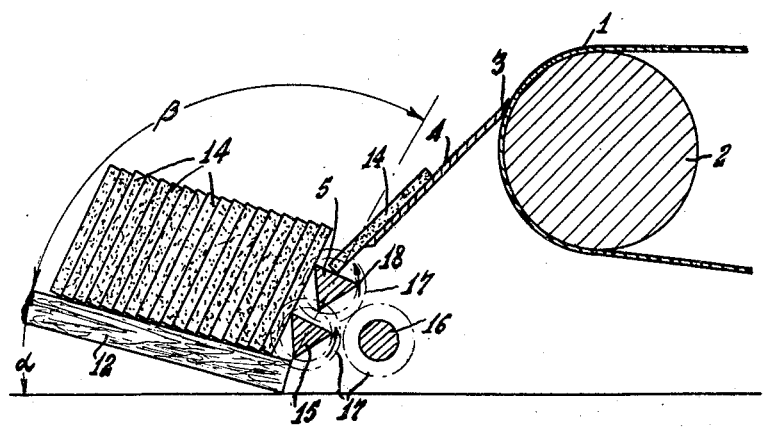
Inventor:-
Marinus Marius den Boer
by Lanyon, Parry, Card Hargeur
Attys.

Patented Feb. 3, 1931

1,791,399

UNITED STATES PATENT OFFICE

MARINUS MARIUS den BOER, OF DORDRECHT, NETHERLANDS, ASSIGNOR TO NAAMLOOZE VENNOOTSCHAP, BAKOVENBOUW V. H. H. P. den BOER, OF DORDRECHT, NETHERLANDS

DEVICE FOR SETTING UP BISCUITS, CAKES, AND THE LIKE

Application filed September 11, 1929, Serial No. 391,959, and in the Netherlands November 2, 1928.

This invention relates to a device for assembling biscuits, cakes and the like so that they may be easily removed in groups and packed in tins, etc.

At present biscuits or the like are removed from the extremity of a belt extruding from a baking oven upon another moving horizontal belt preferably running at the same speed and from which they are removed by hand for the purpose of being packed.

This method is not only very complicated, but will moreover cause a high percentage of wastage of the biscuits and in addition the edges of the biscuits are damaged during the shifting of the biscuits upon one another for assembling them into groups adapted to be packed in tins by a single manipulation.

An important object of this invention is to remove the drawbacks of the present system by providing a device adapted to be mounted at the extremity of the belt of a baking oven. The invention however, is not limited to this particular use but may be used in relation to the assembling of all products of this type.

An object of the invention is to provide one or more setting-up members which are adapted to receive the biscuits and place them upon the surface of a carrier consisting of a bar or the like.

Various embodiments, based upon this principle, are possible according to the nature and dimensions of the biscuits to be set up and the manner in which the biscuits are supplied, the number of rows of biscuits and the system of packing, etc.

In the preferred embodiment two or more setting-up members are superposed one above the other above a stationary setting-up table thus positioned at an angle corresponding to the setting-up position. The setting-up members shift the biscuits forwardly so as to form a row while a biscuit feeding guide is mounted above the uppermost setting-up member.

An important advantage of this particular embodiment is the fact that a stationary setting-up table is sufficient since the setting-up members serve at the same time for shifting the biscuits forwardly.

It is a further object of the invention to provide the surface of the setting-up table sloping downwardly towards the setting-up members which latter are arranged in such a manner that they will prevent the biscuits from tilting.

It is a further object to provide the setting-up members with various shaped and a preferred shape is of a trilateral or other prism.

With these and other objects in view which will become apparent as the description proceeds, the invention consists of the combination and arrangement of parts hereinafter described and claimed.

The figure of the drawing is a diagrammatical, vertical, longitudinal section of a setting-up device according to the invention.

The device shown in the figure comprises an endless feeding belt 1 passing over rollers, one of which only is shown. The belt 1 may serve either for supplying biscuits or the like to the setting-up device, or if desired may be a moving oven floor upon which at the front end the molded pieces of dough are placed and at the back end the baked and cooled biscuits are discharged.

At 3 is shown a thin flat steel knife 4 constituting a biscuit guide which bears upon the feed belt 1 at the place where the latter is supported by the roller 2. Near the lower end of the knife a setting-up member in the form of superposed prisms 5 and 15 are mounted which are adapted to be rotated in unison through means of the shaft 16 and the set of pinions 17 in the directions shown by the rows. It is of course obvious that any suitable frame may be provided for mounting the prisms 5 and 15 and also that any suitable means may be furnished for vertically and horizontally adjusting said prisms.

The biscuits 14 are lifted away from the feed member 1 by the knife 4 which conducts them to the prism 5. A stationary setting-up table 12 is provided upon which the biscuits are adapted to be assembled. The biscuits 14 disposed on the knife-shaped guide 4 are lowered between the prism 5 and the row of biscuits 14 during the rotation of the two prisms. The assembled biscuits are engaged by the rib 18 of the prism 5 and shifted downwardly by the latter and eventually aided by the prism 15. The latter prism serves mainly for periodically shifting forwarding the lower edges of the biscuits and for keeping the assembled row in upright position. It is apparent that no conveying belt is necessary since the setting-up members serve at the same time for the shifting of the rows of biscuits.

The angles alpha and beta are normally 10-15° and ± 100° respectively, but of course these angles may be modified according to the nature and the weight of the biscuits to be assembled. It is obvious that the setting-up table, at least as far as its surface is concerned, may be made adjustable as may also be the prisms and the guide 4. The inclination of the guide 4 is almost equal to the inclination of the biscuits in set-up position. The spacing of the successive biscuits depends on the space required for baking and is of less importance. The number of revolutions of the prisms permitted may vary from 150 to 200 per minute, but of course this speed of revolution depends entirely upon the speed at which the biscuits are supplied to the prisms.

The length of the prisms is determined by the number of rows of biscuits which are simultaneously set-up and of course the prism may have a continuous surface or may be interrupted. It is obvious that in place of prisms other members may be used provided they comply with the requirement that they also feed the set-up biscuits while at the same time placing the set-up biscuits in position.

With the construction above described experiments have shown that the biscuits supplied are shifted rapidly and nicely to the right place in the row of biscuits and that the shifting forwardly of the biscuits by the prisms upon the table is effected in a satisfactory manner without wastage of the biscuits. Predetermined groups of biscuits may be removed from the table at various times so that a continuous operation of the assembling device is possible with far less labor than formerly.

For a production that formerly requires twelve girls it has been found that two or three girls are sufficient for removing the biscuits with my device. If the nature and the dimensions of the biscuits permits, the lower prism 15 may be replaced by another member which will periodically retain and shift forwardly the biscuits.

I claim:

1. A device for assembling or stacking biscuits in a row comprising a stationary carrier, stacking means for receiving the biscuits supplied and tilting them in edgewise position on said stationary carrier, said stacking means comprising a plurality of prisms arranged the one above the other in such a manner that the face of the upper prism acts so as to receive the arriving biscuits, and means for rotating said prisms together to shift the arriving biscuits between their ribs and the biscuits already stacked or assembled, the assembled biscuits thus resting against the prism ribs.

2. A device according to claim 1 in which the supporting face of the stationary carrier is inclined with reference to the horizontal plane and the axes of the prisms are lying in a plane approximately perpendicular to the said supporting face.

3. A device according to claim 1 in which the working face of the stationary carrier is inclined ± 10° to 15° to the horizontal plane and the axes of the prisms are lying in a plane making an angle of ± 100° with reference to the said working face.

In testimony whereof I affix my signature.

MARINUS MARIUS DEN BOER.